(12) United States Patent
Shin (10) Patent No.: US 7,667,741 B2
(45) Date of Patent: Feb. 23, 2010

(54) DEVICE AND METHOD FOR TAKING PICTURE WHILE RECORDING MOVING PICTURE

(75) Inventor: Dae-Kyu Shin, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 647 days.

(21) Appl. No.: 11/388,880

(22) Filed: Mar. 24, 2006

(65) Prior Publication Data

US 2006/0216001 A1    Sep. 28, 2006

(30) Foreign Application Priority Data

Mar. 24, 2005    (KR) .................... 10-2005-0024521

(51) Int. Cl.
*H04N 5/225* (2006.01)
*H04N 5/262* (2006.01)
(52) U.S. Cl. .................. 348/231.1; 348/239; 348/220.1
(58) Field of Classification Search .............. 348/220.1, 348/231.1, 239
See application file for complete search history.

(56) References Cited

U.S. PATENT DOCUMENTS

| 6,172,605 | B1 * | 1/2001 | Matsumoto et al. ......... 340/500 |
| 6,992,707 | B2 * | 1/2006 | Obrador .................. 348/220.1 |
| 2002/0024602 | A1 | 2/2002 | Juen |
| 2003/0090571 | A1 * | 5/2003 | Scheurich ................ 348/207.1 |
| 2003/0095191 | A1 * | 5/2003 | Saito ....................... 348/220.1 |
| 2003/0112347 | A1 * | 6/2003 | Wyman .................. 348/231.99 |
| 2004/0189823 | A1 | 9/2004 | Shibutani |
| 2004/0212694 | A1 | 10/2004 | Miki |
| 2004/0218059 | A1 | 11/2004 | Obrador et al. |
| 2006/0268117 | A1 * | 11/2006 | Loui et al. ............... 348/220.1 |

FOREIGN PATENT DOCUMENTS

JP    2002-084442    3/2002

OTHER PUBLICATIONS

Digitalkameras-Checkliste, C'T Magazin FUR Computertechnik, Aug. 23, 2003, vol. 18, pp. 141-145.

* cited by examiner

*Primary Examiner*—Sinh Tran
*Assistant Examiner*—Hung H Lam
(74) *Attorney, Agent, or Firm*—The Farrell Law Firm, LLP (57) ABSTRACT

Provided is a device and method for taking a still picture and recording a moving picture. The device includes a user interface unit for generating a user input instruction to record the moving picture, and a user input instruction to take the still picture while recording the moving picture; a moving picture recorder for compressing the still pictures into the moving picture, and recording the compressed picture; a camera picture capturing unit for, when there is the user input instruction to take the still picture while recording the moving picture, capturing the still picture; a camera controller for controlling an operation of a camera, and an operation of the camera picture capturing unit; a take-while-record setting unit for storing information on picture-taking; and a controller for generating a signal for controlling to detect the user input instruction to take the still picture while recording the moving picture, and take the still picture while recording the moving picture.

13 Claims, 4 Drawing Sheets

DEVICE AND METHOD FOR TAKING PICTURE WHILE RECORDING MOVING PICTURE

PRIORITY

This application claims priority under 35 U.S.C. § 119 to an application entitled "Device and Method for Taking Picture while Recording Moving Picture" filed in the Korean Intellectual Property Office on Mar. 24, 2005 and assigned Serial No. 2005-24521, the contents of which are incorporated herein by reference.

BACKGROUND OF THE INVENTION

1. Field of the Invention

The present invention relates generally to a device and method for taking a still picture and recording a moving picture using a camera, and in particular, to a device and method for taking a still picture while recording a moving picture.

2. Description of the Related Art

In recent years, owing to remarkable developments of telecommunication technology, and a camera module and multimedia technology, even a wireless telephone can provide a mega pixel based high-resolution picture beyond a size of quarter common intermediate format (QCIF) (176×144) or CIF (352×288). Further, owing to use of a picture compress technique such as Joint Photographic Experts Group (JPEG), there is minimal difficulty even in storage and transmission. Furthermore, a moving picture compress technique such as Moving Picture Experts Group-4 (MPEG-4) and H.26X is applied to the wireless telephone, thereby embodying a camcording function. At present, a moving picture having a size of about quarter video graphics array (QVGA) (320×240) can be recorded.

A camera employs a picture-taking method in which, after a user views a picture through a monitor or a viewfinder while adapting a composition or a focus, the user presses a picture-taking key (e.g. a shutter button), takes a picture, and captures a still picture, and then, upon selection to store the captured picture, compresses the captured picture in a predefined picture compression technique (e.g. JPEG) and stores the compressed captured picture. At this time, a size (e.g. CIF, QCIF, VGA, and XVGA) and a quality (e.g. high and low qualities) are previously set.

A moving picture is recorded a few pictures per second, therefore, it is recorded on the basis of QVGA or QCIF considering a problem of capacity or transmission as well as a problem of performance. Further, a method is employed in which the picture size and quality is previously set, and the captured pictures are compressed using the moving picture compression technique such as the MPEG and then, are stored.

Figure 1:
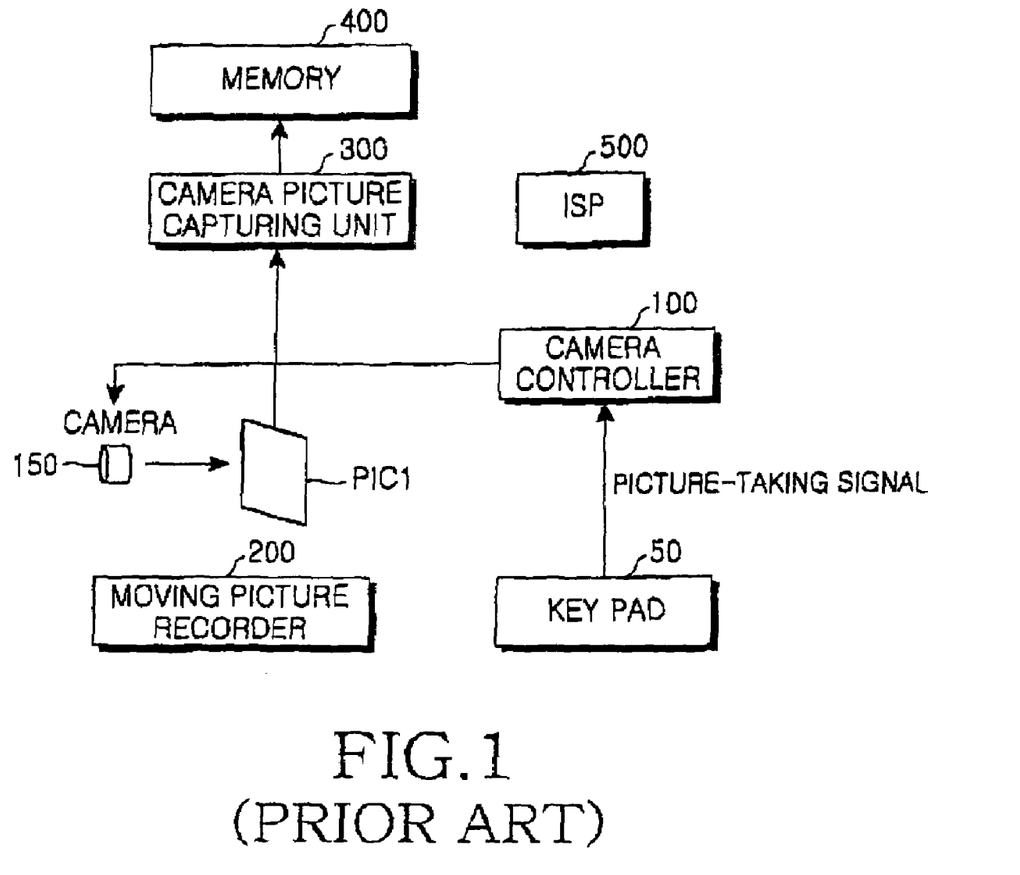
FIG. 1 illustrates a construction and an operation for taking a still picture in a conventional moving picture recording/picture-taking device.

FIG. 1 illustrates a construction and an operation for taking a still picture utilizing a conventional moving picture recording/picture-taking device.

It is assumed that one sheet of picture (PIC 1) is taken. If a user presses a picture-taking key on a keypad 50, a camera controller 100 controls a camera 150 to take the still picture. The camera controller 100 decides a property of camera picture captured by a camera picture capturing unit 300. The still picture captured by the camera picture capturing unit 300 is stored in a memory 400.

Figure 2:
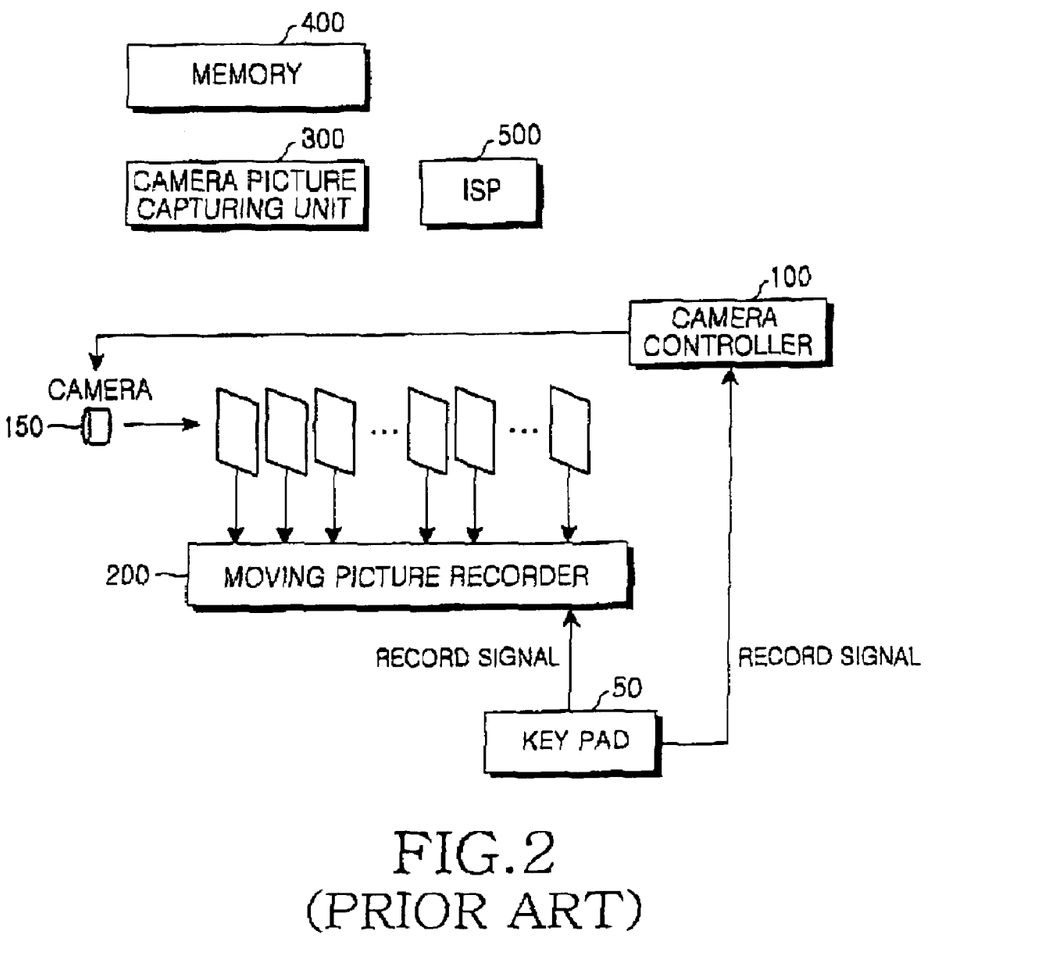
FIG. 2 illustrates a construction and an operation for recording a moving picture in a conventional moving picture recording/picture-taking device.

FIG. 2 illustrates a construction and an operation for recording a moving picture in the conventional moving picture recording/picture-taking device.

If the user presses a record key of the keypad 50, the camera controller 100 controls the camera 150 to record the moving picture. A moving picture recorder 200 continuously compresses the still pictures received through a lens of the camera 150, into the moving picture sheet by sheet, and records the compressed moving picture.

In FIGS. 1 and 2, the moving picture recording/picture-taking device includes the keypad 50, the camera controller 100, the camera 150, the moving picture recorder 200, the camera picture capturing unit 300, the memory 400, and an image signal processor (ISP) 500. However, as in FIG. 1, when taking the still picture only the keypad 50, the camera controller 100, the camera 150, the camera picture capturing unit 300, and the memory 400 are used. Further, as in FIG. 2, when recording the moving picture only the keypad 50, the camera controller 100, the camera 150, and the moving picture recorder 200 are used.

Although the moving picture recording/picture-taking device includes all elements for recording the moving picture and elements for taking the still picture, it performs only a sole function of moving picture recording function and still picture taking function respectively, and does not mutually exchange the functions. In cases where the user desires to take a large still picture with a high quality while still recording the moving picture, the user completes recording, then converts to a picture-taking mode, sets the picture size and quality, and takes one sheet of picture. In order to start again to record the moving picture, the user converts to back a moving picture recording mode, as well as set the picture size and quality. However, during the above operations, time lapses, and consequently, a photography subject may not be already in an original figure for which the user desires to take a still picture.

SUMMARY OF THE INVENTION

It is, therefore, an object of the present invention to provide a device and method for taking a still picture at a desired point in time while recording a moving picture.

It is another object of the present invention to provide a device and method for, with a record mode continuously operating, taking a desired still picture as well, while recording a moving picture.

To achieve the above and other objects, there is provided a device for taking a still picture while recording a moving picture, the device including a user interface unit for generating a user input instructing to record the moving picture, and a user input instructing to take the still picture while recording the moving picture; a moving picture recorder for continuously compressing the still pictures received from a camera, into the moving picture sheet by sheet, and recording the compressed moving picture; a camera picture capturing unit for, when there is the user input instructing to take the still picture while recording the moving picture, capturing the still picture taken by the camera; a camera controller for controlling an operation of the camera, and controlling an operation of the camera picture capturing unit by determining a property of camera picture capture; a take-while-record setting unit for storing information on picture-taking; and a controller for generating a signal for controlling the camera controller, the moving picture recorder, and the camera picture capturing unit to detect the user input instructing to take the still picture while recording the moving picture, and take the still picture while recording the moving picture depending on a value previously set to the take-while-record setting unit.

In still another aspect of the present invention, there is provided a method for controlling to take a still picture while recording a moving picture, in a device having a take-whilerecord setting unit for storing information necessary for taking the still picture while recording the moving picture, the method including during the recording of the moving picture, detecting input of a picture-taking command; upon detecting the input of the picture-taking command, comparing whether a picture in record has the same size as a size of the still picture previously set to the take-while-record setting unit; if the picture in record has the same size as the previously set size of the still picture, capturing and storing a corresponding record picture; and after record is finished, reading and decoding the still picture stored in the memory, and displaying the decoded still picture on a screen. Further, the method includes the step of, if the picture in record has the different size from the previously set size of the still picture, adjusting a camera sensor to take the still picture based on a value set to the take-while-record setting unit and, after the picture-taking is finished, adjusting the camera sensor to have an original setting value for recording the moving picture. Furthermore, the method includes, if the picture in record has the different size from the previously set size of the still picture, adjusting the still picture to have a size of a record picture and transmitting the adjusted still picture to a moving picture recorder so as to use the still picture even as the record picture.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

Figure 3:
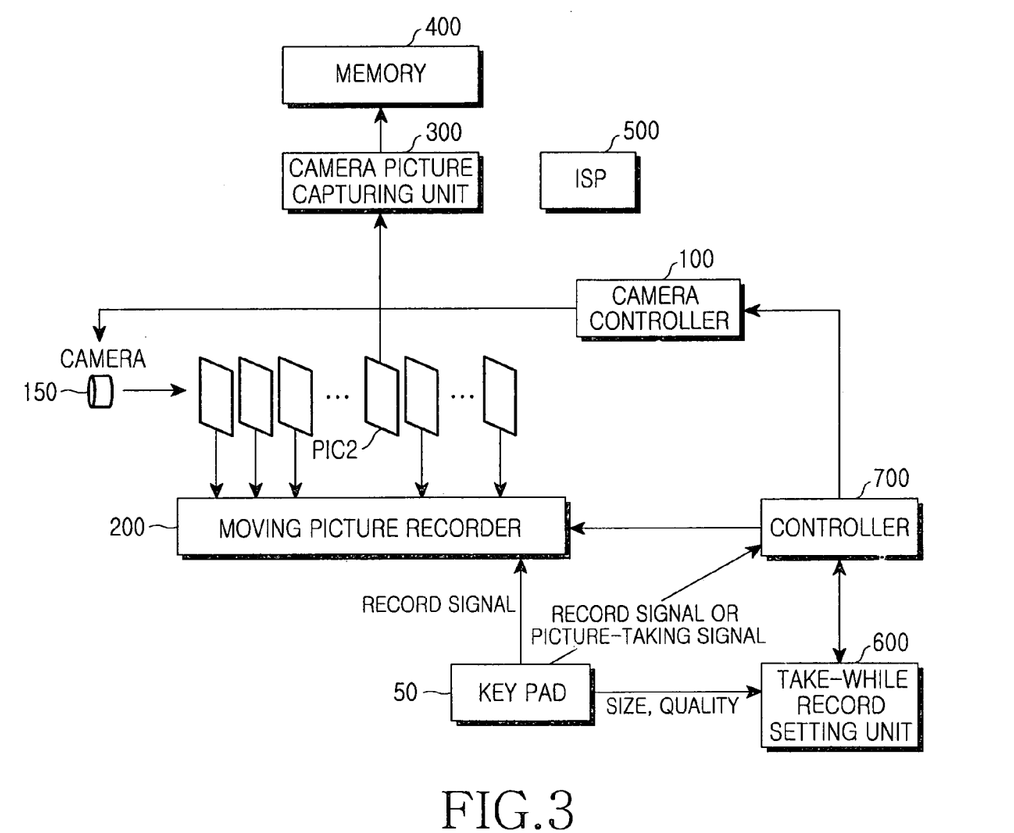
FIGS. 3 and 4 illustrate constructions and operations of devices for taking a still picture while recording a moving picture according to the present invention.
Figure 4:
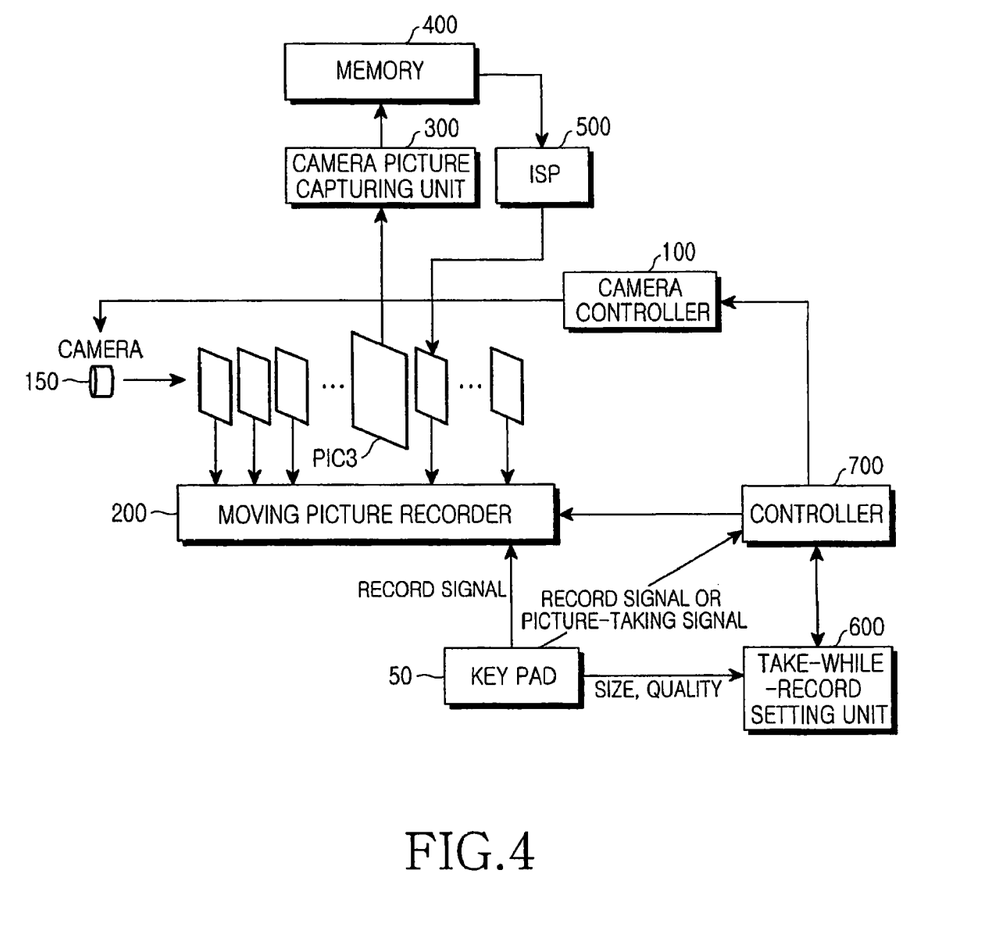

FIGS. 3 and 4 illustrate constructions and operations of devices for taking a still picture while recording a moving picture according to the present invention.

In FIG. 3, the still picture is taken to have the same size as a picture being record, and in FIG. 4, the still picture is taken to have a different size from the picture being recorded.

The inventive devices shown in FIGS. 3 and 4 each include a keypad 50, a camera controller 100, a camera 150, a moving picture recorder 200, a camera picture capturing unit 300, a memory 400, an image signal processor (ISP) 500, a take-while-record setting unit (or photographing-while-record setting unit) 600, and a controller 700.

The key pad 50 is an example of a user interface unit, and includes keys for generating user input instructing to record the moving picture or instructing to take the still picture while recording the moving picture.

The moving picture recorder 200 continuously compresses the still pictures received from the camera 150 into the moving picture sheet by sheet, and records the compressed moving picture.

The memory 400 stores the still picture taken while recording the moving picture.

The camera picture capturing unit 300 captures the still picture taken using a sensor (e.g. a charge-coupled device (CCD) sensor) of the camera 150, and transmits the captured picture to the memory 400. For reference, a procedure of a user's pressing a picture-taking key to capture a digital picture will be briefly described as follows. First, if a mechanical shutter is opened, the CCD sensor is exposed to light. The light is converted into CCD charges. If the shutter is closed, the light is cut off, and the CCD charges are outputted from a CCD and are converted into a signal. This signal is converted in a digital format, and the digital data is captured to a memory.

Meantime, the camera picture capturing unit 300 can also memorize only position information (frame number) of a record picture without storing the captured picture in the memory 400.

The camera controller 100 controls an operation of the camera picture capturing unit 200. In other words, the camera controller 100 decides a property of camera picture capture. The property can be exemplified as a picture size, a picture quality, and several balances and effects (e.g. Sepia tone).

The take-while-record setting unit 600 stores information on picture taking. The picture-taking information is set by the user using the keypad 50 before the moving picture is recorded. The setting of the picture-taking information can be performed under the control of a terminal user interface (UI) application.

The ISP 500 reduces or enlarges a size of the still picture taken while recording the moving picture, which is stored in the memory 400, so as to use the reduced or enlarged picture as a moving record picture.

In a case where a signal such as a picture-taking key signal resulting from user's pressing is generated while the moving picture is recorded, the controller 700 generates a signal for controlling the camera controller 100, the moving picture recorder 200, and the camera picture capturing unit 300 depending on contents previously set to the take-while-record setting unit 600. For example, when the moving picture recorder 200 compresses and records the moving picture, it can have a variation such as inserting an intra-picture or deciding the picture quality depending on the control signal of the controller 700. When the picture being recorded has the same size as a previously set size of the still picture, the controller 700 can generate a control signal for instructing the camera picture capturing unit 300 to capture the still picture and memorize a position where the captured picture is recorded as the recorded picture in the moving picture recorder 200. When the picture being recorded has a different size from the previously set size of the still picture, the controller 700 can generate a control signal for instructing the camera controller 100 to control the camera 150 to take the still picture on the basis of a value set to the take-while-record setting unit 600, and can also generate a control signal for instructing the camera picture capturing unit 300 to capture and transmit the still picture to the memory 400.

A method for taking the still picture while recording the moving picture according to the present invention will be described in detail with reference to FIG. 3 below.

Before the moving picture is recorded, when the user inputs and sets the picture quality (e.g. high and low qualities of picture), the picture size (e.g. XVGA and VGA), and the effects, which are necessary for taking the still picture while recording the moving picture, through the key pad 50, the input contents are stored in the take-while-record setting unit 600.

If the user presses a record key through the keypad 50, the moving picture recorder 200 starts to record the moving picture.

After that, the user can press the picture-taking key at a desired point in time in the course of recording. If the user presses the picture-taking key through the keypad 50, the controller 700 detects the pressed picture-taking key. The controller 700 reads information on the size of the still picture previously set to the take-while-record setting unit 600 and compares the read size information with the size of the picture being recorded, thereby checking whether they are the same.

In case where the picture being recorded has the same size as the previously set size of the still picture, the still picture is taken as set for recording. In other words, the recorded picture can be used as it is without a separate still picture. In detail, the controller 700 transmits the control signal to the camera picture capturing unit 300, performs a high quality I-picture encoding for the captured picture (e.g. PIC 2) captured by the camera picture capturing unit 300 receiving the control signal, and transmits the encoded picture to the moving picture recorder 200. The position information, that is, the frame number of the record picture recorded in the moving picture recorder 200 is memorized in the camera picture capturing unit 300.

After the recording is finished, the user views the still pictures sheet by sheet and determines whether to store the still pictures. Since the camera picture capturing unit 300 memorizes the frame number, it can read the still picture corresponding to the memorized frame number from the moving picture recorder 200, decode the read picture, and display the decoded picture on a display unit (not shown). In the case where the user views the still picture on the display screen and requests to store the displayed picture, the displayed picture is compressed by a picture compression technique such as JPEG and is stored in a memory (different from the memory 400 and not shown). Such a process after recording has no relation with the controller 700, and is performed by the terminal UI application.

It is effective that the camera picture capturing unit 300 memorizes only the frame number as described above because the memory is reduced in its use. Further, it does not need to pause the recording of the moving picture in order to take the still picture, and the captured picture is used as it is for recording the moving picture and therefore, a burden can be reduced when the moving picture is recorded. Further, the captured picture is of high quality and therefore, if the captured picture is used as it is for the recording of the moving picture (if the high-quality picture is included in the record pictures), a compression efficiency can be enhanced.

Meantime, in another embodiment not shown, it can be also realized that a camera picture capturing unit 300 captures one sheet of picture (e.g. PIC 2) and transmits the captured picture to a memory 400. In such a method, the captured picture stored in the memory 400 can be used as it is for the recording of the moving picture. This is achieved by enabling the controller 700 to read the captured picture from the memory 400 and transmit the read captured picture to the moving picture recorder 200. Likewise, in the case where the captured picture is used as it is for the recording of the moving picture, the high quality I-picture encoding is applied. After the recording is finished, when the user views the still pictures sheet by sheet and determines whether to store the still pictures, the captured picture stored in the memory 400 is read, decoded, and displayed on the display unit.

A method for taking the still picture while recording the moving picture according to the present invention will be described in detail with reference to FIG. 4 below.

Likewise as in FIG. 3, the user inputs the setting values (picture quality, picture size, and effect), which are necessary for taking the still picture while recording the moving picture, using the key pad 50, and stores the input setting values in the take-while-record setting unit 600.

The user presses the record key through the keypad 50 to start to record the moving picture through the moving picture recorder 200. After that, if the user presses the picture-taking key through the keypad 50 at any time point, the controller 700 detects the pressed picture-taking key as a take-while-record command. The controller 700 reads the previously stored size information of the still picture from the take-while-record setting unit 600, and checks whether the read size information is the same as the size of the picture being recorded.

In the case where the picture begin recorded has a different size from the previously set size of the still picture, the controller 700 transmits the control signal to the camera controller 100, and controls the camera 150 to take the still picture using the set value of the take-while-record setting unit 600. In the case where a sensor of the camera 150 is destabilized due to a change of setting, one or two pictures can also be skipped until the camera sensor is stabilized. It can be realized that the camera sensor state can be checked in state by the controller 700 or the camera controller 100.

The controller 700 transmits the control signal to the camera picture capturing unit 300, and transmits one sheet of the still picture (e.g., PIC 3) to the memory 400.

The captured picture stored in the memory 400 can be enlarged or reduced in size, for use of the recording of the moving picture. This can be achieved by enabling the controller 700 to read the captured picture from the memory 400 and transmit the read captured picture to the ISP 500 and to, when the ISP 500 enlarges or reduces the captured picture in size, transmit the enlarged or reduced captured picture to the moving picture recorder 200. Unlike the shown, the ISP 500 can be also embedded into the controller 700.

In cases where the captured picture should be reduced in size, the captured picture larger than the recording picture is decimated to have a size set for the recording, and the decimated captured picture is transmitted to the moving picture recorder 200. The reason why the capture picture is decimated and used as the recording picture is to keep a reproduction screen feeling natural. If several sheets of pictures are skipped, the reproduction screen is felt somewhat differently. Therefore, in order to minimize the skip, it is required to decimate and reuse even the still picture (captured picture) without the skip.

Since the recording of the moving picture should be kept in the same size (size of the recording picture), decimation is performed to adapt to the size of the recording picture. Generally, the still picture has a large size, that is, a high resolution. For example, the still picture is based on a unit of mega pixels (1000×1000 or more pixels) but, at present, the moving picture is recorded at the size of about QVGA (320×240). Therefore, in order to adapt the size of the recording picture, it is required to provide the still picture of the mega pixel unit based on the QVGA, thereby reducing the screen in size. This is referred to as "decimation". If the moving picture can be recorded on the basis of the mega pixel unit, it of course needs enlargement as well.

If the picture-taking is finished, the controller 700 informs the camera controller 100 of the finishing of the picture-taking, and the camera controller 100 again recovers the camera sensor to have an original setting value for recording the moving picture. By this recovery, the camera sensor can be also in a temporarily unstable in state. If so, until the camera sensor is again stabilized, one or two sheets can be skipped. The moving picture recorder 200 performs the super high quality (I-picture) encoding for one or two sheets of pictures being the first after the skip, and eliminates a relationship with a previous picture (because a P-picture is defined as a relationship with a previous picture), thereby stopping deteriorating of the picture quality. However, the super high quality (I-picture) encoding is not essential.

After the recording is finished, when the user views the still pictures sheet by sheet while determining whether to store the still pictures, the captured picture stored in the memory 400 is read, decoded and displayed on the display unit. In the case where the user views the display screen and requests to store the displayed picture, the displayed picture is compressed in the picture compression technique (e.g. JPEG) and is stored in a memory (different from the memory 400 and not shown). Such a process after recording has no relation with the controller 700, and is performed by the terminal UI application.

FIGS. 3 and 4 are based on the assumption that one sheet of picture is taken, but even several sheets of pictures are continuously applicable in the same method and also, even the continuous picture-taking is also applicable likewise.

As described above, in the present invention, it is possible to take a still picture even without stopping recording of a moving picture. By this, in the course of recording the moving picture, the still picture can be taken and held at a momentary time that the user does not desire to miss. Therefore, user's satisfaction for a product can be not only enhanced, but also a purchase desire for the product can be enhanced.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A device for taking a still picture while recording a moving picture, the device comprising:
   a user interface unit for generating a user input instruction to record the moving picture, and a user input instruction to take the still picture while recording the moving picture;
   a moving picture recorder for continuously compressing the still pictures received from a camera, into the moving picture sheet by sheet, and recording the compressed moving picture;
   a camera picture capturing unit for, when there is the user input instruction to take the still picture while recording the moving picture, capturing the still picture taken by the camera;
   a camera controller for controlling an operation of the camera, and controlling an operation of the camera picture capturing unit by determining a property of camera picture;
   a take-while-record setting unit for storing information on picture-taking,
   a memory for storing the still picture taken while recording the moving picture; and
   a controller for detecting the user input instruction to take the still picture while recording the moving picture, and generating a signal for controlling the camera controller, the moving picture recorder, and the camera picture capturing unit to take the still picture while recording the moving picture depending on a value previously set in the take-while-record setting units,
   wherein the controller compares a size of the still picture previously set in the take-while-record setting unit with a size of a picture being recorded, and generates control signals reflecting the comparative result, and when the picture being recorded has a different size as the previously set size of the still picture, the controller generates a control signal for instructing the camera controller to enable the camera to take the still picture based on the value set in the take-while-record setting unit, and generates a control signal for instructing the camera picture capturing unit to capture the still picture and transmit the captured picture to the memory.

2. The device of claim 1, wherein, in a case where the picture being recorded has the same size as the previously set size of the still picture, the controller generates a control signal for instructing the camera picture capturing unit to capture the still picture and memorize a position where the captured picture is recorded as a recorded picture in the moving picture recorder.

3. The device of claim 2, wherein information on the memorized position of the recorded picture is used to search the moving picture recorder for a corresponding picture, and then the corresponding picture is decoded and displayed so that, after recording is finished, a user can view the still picture and determine whether to store the still picture.

4. The device of claim 1, wherein, after starting to take the still picture based on the value set in the take-while-record setting unit, a camera sensor is checked and, if the camera sensor is determined to be unstable, the still picture is skipped until the camera sensor is stabilized.

5. The device of claim 1, further comprising an image signal processor for reducing or enlarging a size of the still picture stored in the memory so as to use the stored still picture as a moving recorded picture.

6. The device of claim 5, wherein the controller reads and transmits the captured picture from the memory to the image signal processor, and the image signal processor adjusts the captured picture to have a size of the moving recorded picture and transmits the adjusted captured picture to the moving picture recorder.

7. The device of claim 1, wherein if picture-taking is finished, the controller informs the camera controller of the finishing of the picture-taking, and the camera controller again recovers the camera sensor to have an original setting value for recording the moving picture.

8. The device of claim 7, wherein, after the camera sensor setting is recovered, the state of the camera sensor is checked and, if the camera sensor is determined to be unstable, the still picture is skipped until the camera sensor is stabilized.

9. The device of claim 8, wherein the moving picture recorder encodes at least one still picture being the first after the skip, into a super high quality.

10. A method for taking a still picture while recording a moving picture, in a device having a take-while-record setting unit for storing information necessary for taking the still picture while recording the moving picture, the method comprising the steps of:
   during the recording of the moving picture, detecting input of a picture-taking command;
   upon detection of the input of the picture-taking command, comparing whether a picture being recorded has the same size as a size of the still picture previously set to the take-while-record setting unit;

if the picture being recorded has the same size as the previously set size of the still picture, memorizing a position where a corresponding record picture is recorded as a moving picture; and after recording is finished, searching the memorized position of the recorded picture for the corresponding recorded picture, decoding the searched record picture, and displaying the still picture on a screen.

11. A method for taking a still picture while recording a moving picture, in a device having a take-while-record setting unit for storing information necessary for taking the still picture while recording the moving picture, the method comprising the steps of:

during the recording of the moving picture, detecting input of a picture-taking command;

upon detection of the input of the picture-taking command, comparing whether a picture being recorded has the same size as a size of the still picture previously set to the take-while-record setting unit;

if the picture being recorded has the same size as the previously set size of the still picture, capturing the picture being recorded and then storing the captured picture in a memory, and if the picture being recorded has a different size from the previously set size of the still picture, adjusting a camera sensor to take the still picture based on a value set in the take-while-record setting unit, capturing the still picture, and storing the captured picture in the memory; and after recording is finished, reading and decoding the captured picture stored in the memory, and displaying the decoded captured picture on a screen.

12. The method of claim 11, further comprising, if the picture being recorded has the different size from the previously set size of the still picture, after the picture-taking is finished, adjusting the camera sensor to have an original setting value for recording the moving picture.

13. The method of claim 12, further comprising, if the picture being recorded has the different size from the previously set size of the still picture, adjusting the still picture to have a size of a recorded picture and transmitting the adjusted still picture to a moving picture recorder so as to use the still picture even as the recorded picture.

* * * * *

UNITED STATES PATENT AND TRADEMARK OFFICE
CERTIFICATE OF CORRECTION

PATENT NO.       : 7,667,741 B2                                     Page 1 of 1
APPLICATION NO.  : 11/388880
DATED            : February 23, 2010
INVENTOR(S)      : Dae-Kyu Shin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 974 days.

Signed and Sealed this

Seventh Day of December, 2010

David J. Kappos
*Director of the United States Patent and Trademark Office*